C. G. LUNDSTROM.
RESILIENT TIRE.
APPLICATION FILED AUG. 21, 1919.
1,362,123.
Patented Dec. 14, 1920.
2 SHEETS—SHEET 1.
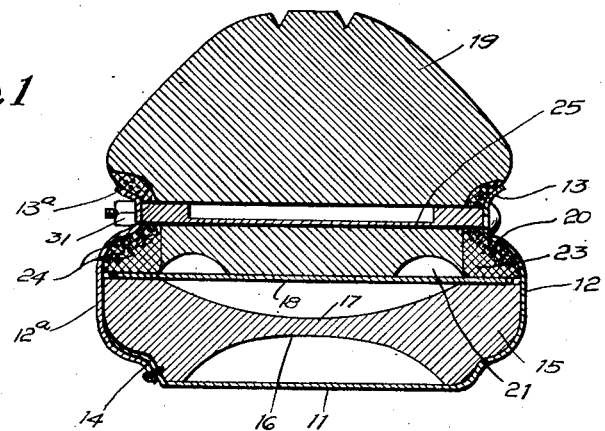
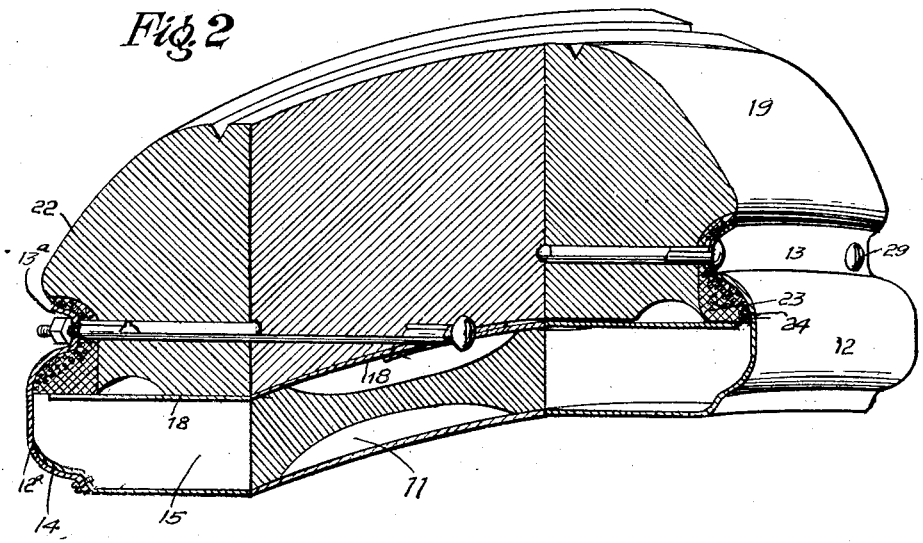
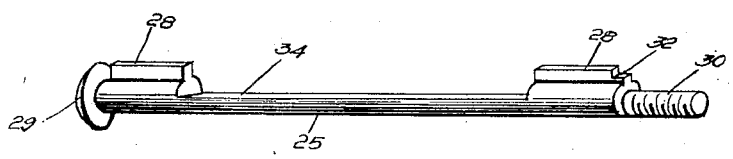

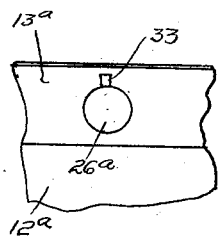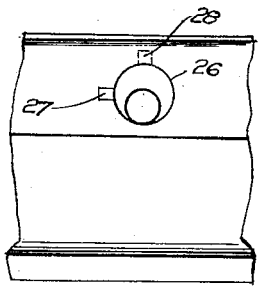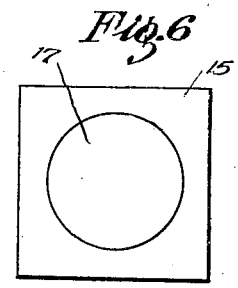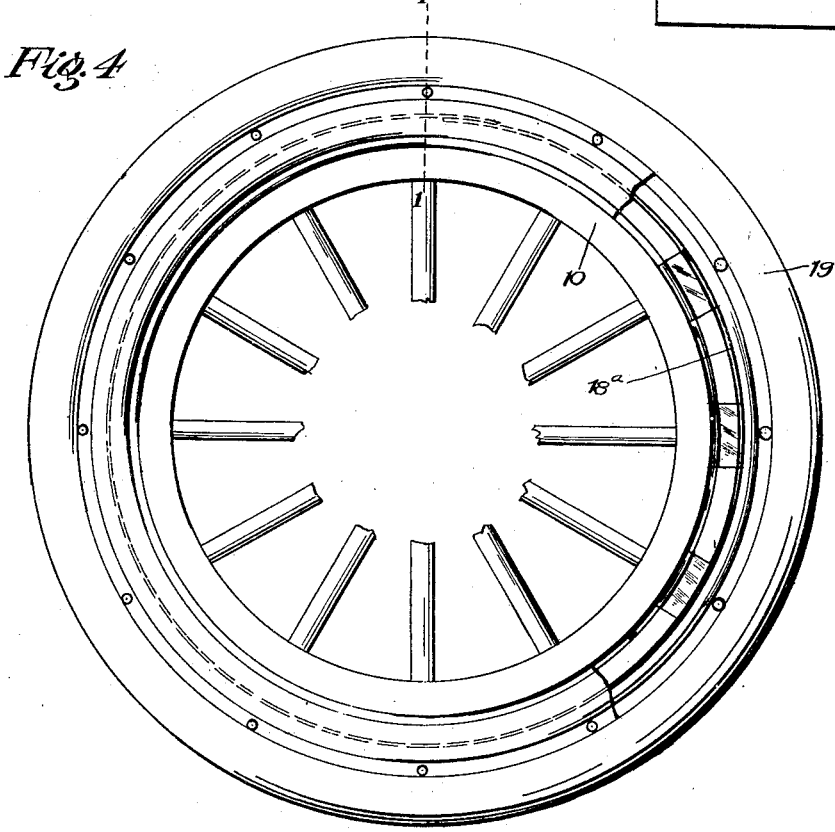

UNITED STATES PATENT OFFICE.

CARL G. LUNDSTROM, OF AMES, IOWA.

RESILIENT TIRE.

1,362,123.  Specification of Letters Patent.  Patented Dec. 14, 1920.

Application filed August 21, 1919. Serial No. 319,826.

*To all whom it may concern:*

Be it known that I, CARL G. LUNDSTROM, a citizen of the United States, and a resident of Ames, in the county of Story and State of Iowa, have invented a certain new and useful Resilient Tire, of which the following is a specification.

The object of my invention is to provide a resilient tire of simple, durable and inexpensive construction.

More particularly it is my object to provide a resilient tire adapted to be used in place of pneumatic tires, and yet having substantially the advantages of a pneumatic tire without any danger of puncture.

Still a further object is to provide a resilient tire comprising a rim member having a detachable side, the sides of the rim member having opposite channels, and to provide in connection therewith a resilient band free to play radially of the wheel on which the tire is mounted, said rim member having a plurality of spaced, resilient blocks inside said resilient band, and to provide a rubber tire having annular grooves in its sides and annular grooves on its inner surface.

A further object is to provide in connection with such a rim a series of bolts extending through the sides of said rim member, said bolts having their upper portions cut away to allow play of the outer rubber tire.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a transverse, sectional view of a resilient tire embodying my invention, taken on the line 1—1 of Fig. 4.

Fig. 2 is a fragmental perspective view of the tire showing parts in transverse and parts in longitudinal section.

Fig. 3 shows a perspective view of one of the bolts.

Fig. 4 shows a side elevation of a wheel equipped with my resilient tire, parts being broken away.

Fig. 5 shows a side elevation of part of a metal rim member illustrating the bolt therein.

Fig. 6 shows a top or plan view of one of the cushioning blocks; and

Fig. 7 shows a side elevation of a portion of the removable rim wall.

In the accompanying drawings I have used the reference numeral 10 to indicate generally the felly of a wheel on which my improved resilient tire is mounted.

My tire comprises a rim member 11, having at one side a side wall 12 substantially shaped as shown in Fig. 1. The wall member 12 is formed with a main channel opening toward the tire, and having at its outer edge an oppositely opening channel-shaped portion 13.

At the other side of the rim member 11 is a side wall member 14. For coacting with the side wall member 14 and forming the complete rim member, there is provided a detachable side wall $12^a$ of the same shape as the side wall 12, having at its outer edge an outwardly opening, channel-shaped member $13^a$, similar to the portion 13 of the side wall 12.

On the outer surface of the rim member 11 is a series of circumferentially spaced, resilient blocks 15, each formed with a recess 16 in its inner surface, and another recess 17 in its outer surface.

Surrounding the blocks 15 is a floating, annular, resilient band 18. Outside the band 18 is a rubber tire 19 having in its sides adjacent to its inner surface grooves or channels 20 extending circumferentially of the rubber tire. The tire 19 has on its inner surface spaced, annular grooves 21, and has extending through it from side to side a series of holes 22 to receive the bolts hereinafter described.

At the sides of the rubber tire 19 said tire is provided with annular reinforcing fabric portions 23, and with wire reinforcements 24.

For fastening the parts together in completely assembled position, bolts 25 having the form shown in Fig. 3 are provided. These bolts are inserted through holes 26 and $26^a$ in the rim members 13 and $13^a$.

Each hole 26 is formed with an extension or key-hole slot 27 for a purpose which will be hereinafter mentioned.

The bolts 25 are provided near their opposite ends with laterally extending ribs 28 designed to be inserted through the extensions 27.

The rib 28, adjacent to the head of the bolt, terminates short of the head 29 leaving a space between said rib 28 and the head 29 adapted to receive the edge of the metal of the side wall of the rim member 11.

The end of the bolt 25 opposite the head is screw-threaded at 30 to receive a nut 31.

The rib 28 at its end adjacent to the threaded portion 30 of the bolt is provided with a notch 32.

The hole 26ª in the channel-shaped portion 13ª of the removable side wall member of the rim member 11, is provided with a shorter key-hole slot or extension 33, through which the end of the rib 28 is extended, so that the metal of the side wall member 12ª is received in the notch 32, and the extreme end of the rib 28 adjacent to the threaded portion 30 extends through the key-hole slot 33 thus preventing the bolt from turning when the nut is installed thereon. The bolts are inserted by turning the bolts to position where the ribs 28 may be inserted through the key-hole slots 27.

After the screw-threaded end of the bolt has been inserted through the bolt hole 26ª, the bolt is rotated until the rib 28, adjacent to the head 29 extends radially outwardly, and then the side wall member 12ª is pushed farther on to the bolt until the extreme end of the rib 28 extends through the key-hole slot 33 with the shoulder formed at the notch 32 engaging the inner surface of the rim portion 13ª. The nut is then assembled on the bolt and the parts will be firmly locked together.

Each bolt is cut away between the ribs 28 to approximately half its normal thickness, as indicated at 34 in Fig. 3, so that when the bolts are assembled in the rubber tire 19 a space will be left between the outer surfaces of the bolts and the tire 19.

After the parts have been assembled in a complete tire, it will be understood that the tire may be mounted on the wheel in the same manner as any ordinary demountable rim.

In the practical use of my improved resilient tire, when a weight is imposed on the wheel and tire, the effect of resiliency is obtained in several ways. The central portion of the tire 19 is compressed radially inwardly by the load.

It is obvious that between the successive bolts 25, the tire 19 may be compressed inwardly without obstruction. When the bolts are inserted through said tire 19, the formation of the bolts with the cut away portions 34 permit the tire 19 to be compressed radially inwardly also.

The radial inward pressure of the tire 19 will cause the resilient band 18 to be pressed inwardly for compressing some of the blocks 15.

While the space formed by the recesses 16 and 17 are not entirely air tight they are nearly enough air tight, so that the movement of air into them and out of them is comparatively slow, and with a rapid movement of the wheel, the action of the blocks is such as to successively tend to compress the air in such spaces.

It will be understood that there is some in and out play of the band 18.

The greatest inner movement, of course, will be adjacent to the ground, and the outward movement will be spread around the entire remainder of the circumference of the tire. It is, therefore, obvious that the making of the bolts with the cut away portions 34 makes it possible for the tire 19 to press inwardly. Where the tire is on the ground, it is not necessary to have any similar provision for permitting radial outward movement of the parts of the tire 19, for the reason that the outer movement of said tire is spread around the tire.

The employment of the fabric and wire reinforcing, especially when used in connection with bolts, does away with all danger of pulling the tire 19 away from the rest of the rim.

The annular resilient band 18 may be made in the form of a split ring with the ends overlapping, as shown in Fig. 2.

The removable side of the rim member 11 may be secured to said ring member by screws as shown, if desired. The rim member 11 and its side walls are made in the form of a demountable rim so that ordinary means for locking a demountable rim on a wheel may be used with my structure.

My present device is an improvement on the device shown in my prior application for patent filed February 12, 1918, Serial Number 216,727, and allowed on June 29, 1918.

Some changes may be made in the construction and arrangement of the parts of my improved resilient tire without departing from the essential features and purposes of my invention, and it is my intention to cover by my claim any modified forms of structure or use of mechanical equivalents, which may be included within the scope of my claim:

I claim as my invention:

In a device of the class described, a rim having integral side walls, one of said side walls being shorter than the other, and having a removable side wall, a resilient tire having its inner portion received in the outer portion of said rim, bolts extended through the longer of said side walls and through said removable side wall, one of said last described side walls having openings through it formed with key-hole slots, the other of said last mentioned side walls having similar openings with shorter key-hole slots, said bolts being formed with ribs, the rib adjacent to the head terminating short of the head and being adapted to enter the first described key-hole slot, the other rib of each bolt having in its extreme end a notch adapted to fit the second described key-hole slot, whereby the bolts may be held against rotation when installed.

Des Moines, Iowa, February 19, 1919.

CARL G. LUNDSTROM.